(No Model.) 3 Sheets—Sheet 2.
A. W. STREET.
ABRADING MACHINE.
No. 455,131. Patented June 30, 1891.
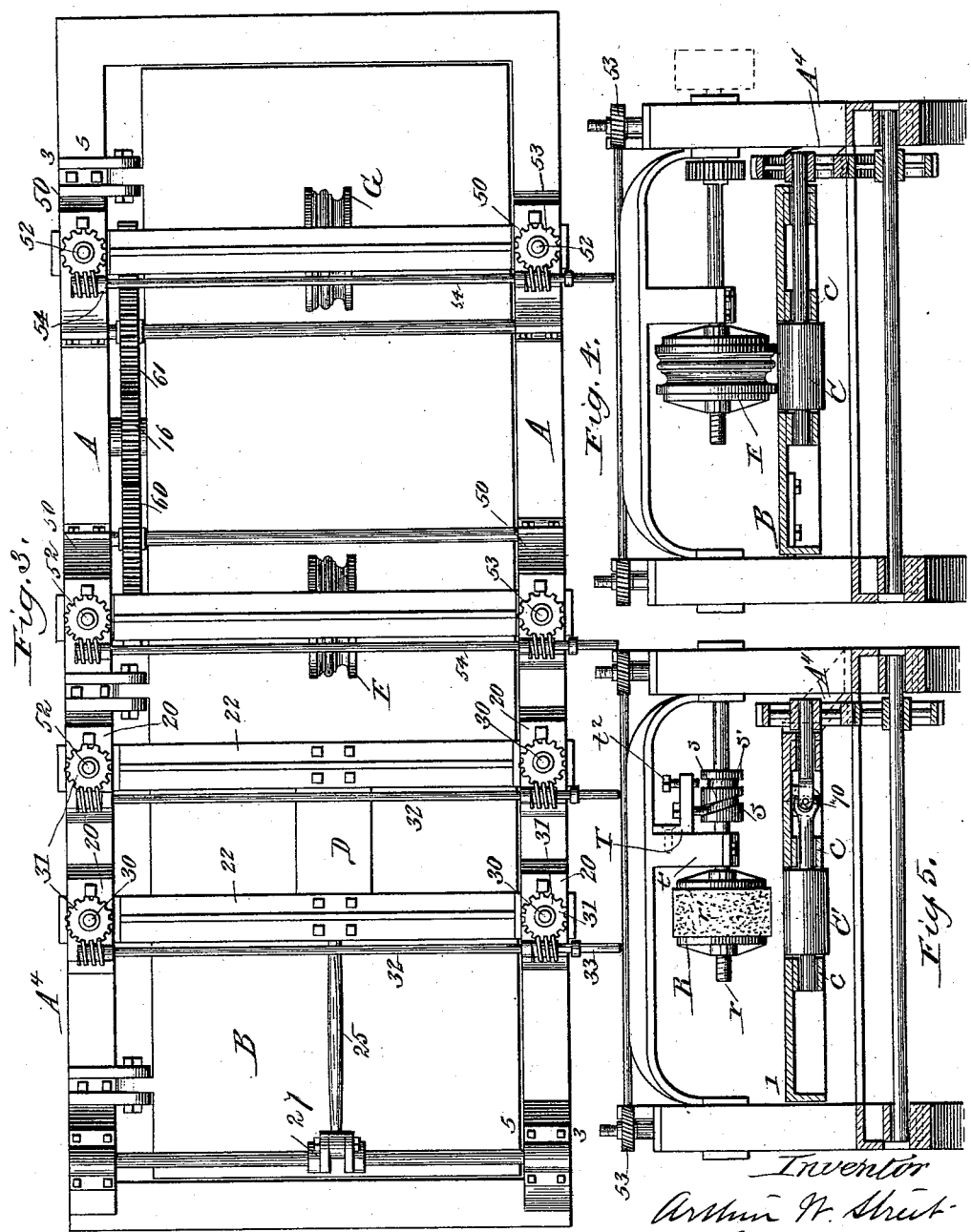

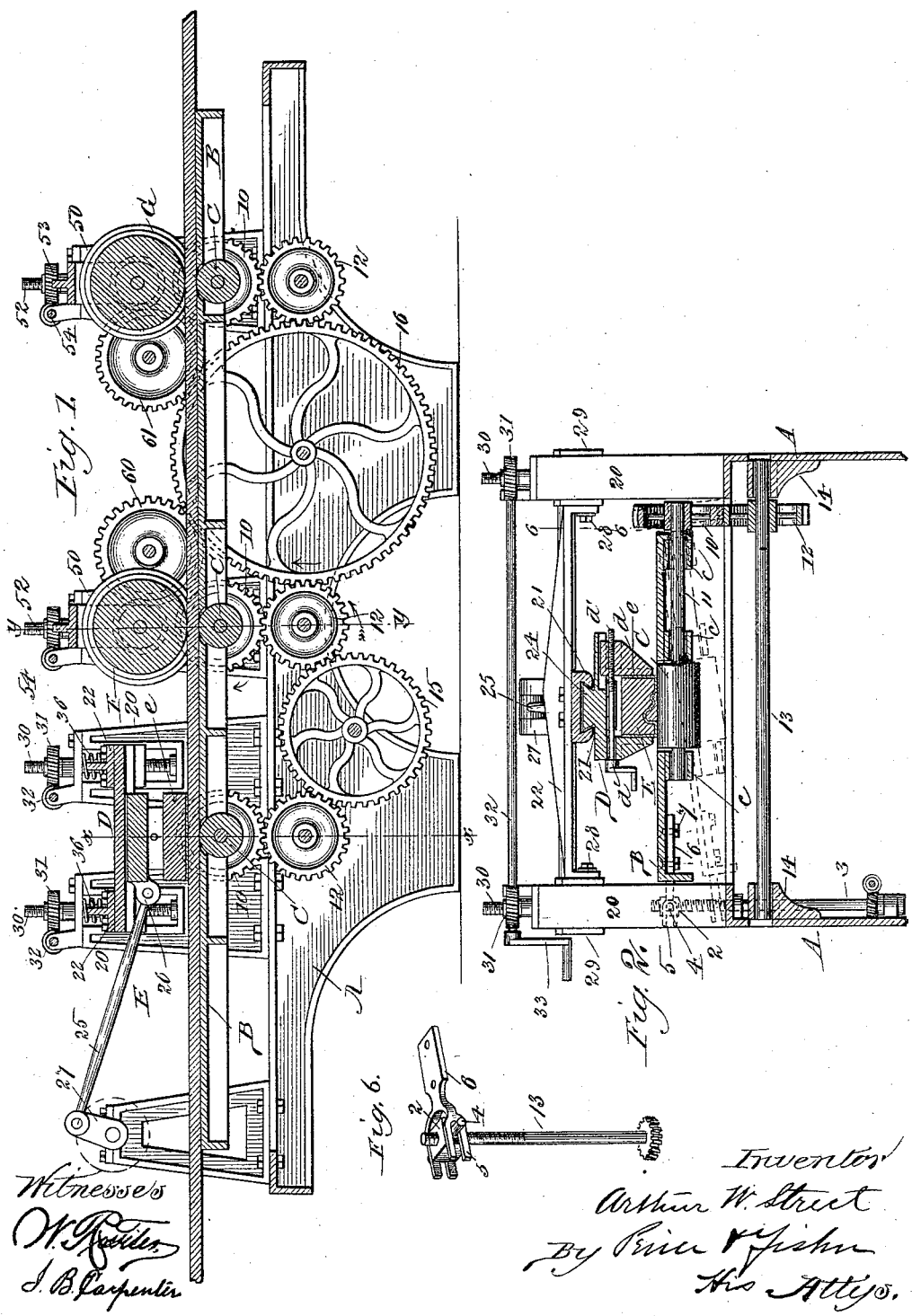

(No Model.)

3 Sheets—Sheet 3.

A. W. STREET.
ABRADING MACHINE.

No. 455,131.

Patented June 30, 1891.

Witnesses:
Fred Gerlach
J. B. Carpenter.

Inventor:
A. W. Street.
By Peters & Fisher
Attorneys.

UNITED STATES PATENT OFFICE.

ARTHUR W. STREET, OF CHICAGO, ILLINOIS.

ABRADING-MACHINE.

SPECIFICATION forming part of Letters Patent No. 455,131, dated June 30, 1891.

Application filed February 15, 1890. Serial No. 340,525. (No model.)

*To all whom it may concern:*

Figure 7:
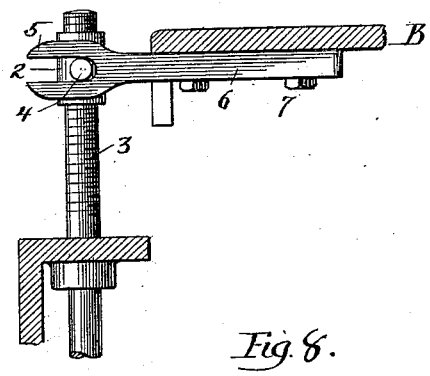
Figure 9:
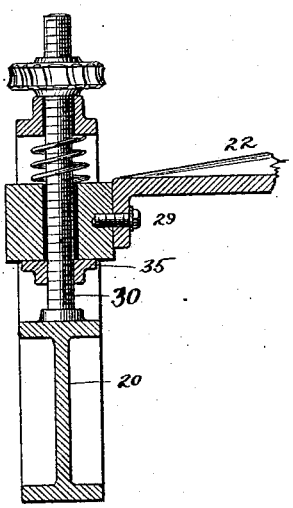
Figure 8:
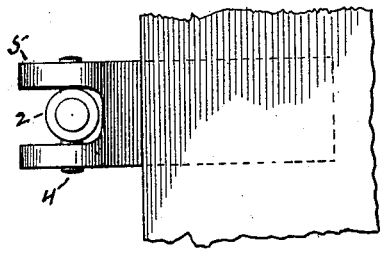

Be it known that I, ARTHUR W. STREET, residing at Chicago, in the county of Cook and State of Illinois, have invented certain new and useful Improvements in Abrading-Machines, of which I do declare the following to be a full, clear, and exact description, reference being had to the accompanying drawings, forming part of this specification.
My present invention has for its object to provide a simple and effective mechanism whereby the sandpapering or like abrasion of the surfaces of moldings and other articles may be effected; and this object I have accomplished by the novel features of construction hereinafter described, illustrated in the accompanying drawings, and particularly pointed out in the claims at the end of this specification.
Figure 1 is a view in vertical longitudinal section through a machine embodying my invention. Fig. 2 is a view in cross-section on line $x$ $x$ of Fig. 1. Fig. 3 is a plan view. Fig. 4 is a view in transverse section on line $y$ $y$ of Fig. 1. Fig. 5 is a view in transverse section through a machine similar to that illustrated in the foregoing figures, but showing a plain cylindrical abrading-roll and means for laterally reciprocating the same, and showing also the modified mechanism for tilting the work-table. Fig. 6 is a detail view showing the adjusting-shaft and yoke for the tilting table. Fig. 7 is a detail view showing mechanism for tilting the table. Fig. 8 is a plan view of the same. Fig. 9 is a detail view showing the parts for adjusting and supporting the cross-bars which have secured thereto the guides for the abrading-block.

A designates the main frame of the machine, and B denotes the tilting work-table, and C designates the feed-rolls that are sustained by hangers $c$ upon the under side of the work-table, so that these feed-rolls may be tilted in order to present the work at the desired inclination. The table B is sustained at one side by means of one or more swivel-couplings, comprising a threaded sleeve 2, that is carried by the vertical screw-shaft 3, this threaded sleeve 2 being provided with arms or trunnions 4, upon which rest the yoke-shaped ends 5 of a bar 6 that is bolted, as at 7, to the under side of the table. The oppo-
site side of the table is sustained by suitable hinge-brackets $A^4$ attached to the table and to the main frame, and at this side of the main frame are the gear-wheels 10 upon the ends of the shafts 11 of the feed-rolls C. The gear-wheels 10 engage with gear-wheels 12, the transverse shafts 13 of which are carried by suitable journal-boxes or bearings 14 at the sides of the main frame, and the gear-wheels 10 may be formed with curved teeth, so as to more readily permit the tilting of the shafts and of the wheels when desired.

Motion is imparted to the gear-wheels 12 in any suitable manner—as, for example, by a gear-wheel 15, that meshes with the front and middle of these gear-wheels 12, while the middle and rear gear-wheels 12 are shown as united by the gear-wheel 16. It will be understood, however, that any other convenient means for imparting motion to the feed-rolls may be provided.

From the sides of the main frame A rise the standards 20, that serve to sustain the clamp or holder D, that carries an abrading-block E, this clamp or holder being mounted in a manner free to reciprocate within a suitable slide-way 21, that is bolted to the under side of the cross-beams 22, extending from side to side of the machine. The abrading-block E, if designed for use upon moldings of irregular outline (and it is for such class of work that my machine is more particularly adapted) is provided upon its under face with a groove of irregular outline corresponding to the outline of that part of the molding that is to be abraded, and over this block is preferably placed a sheet of sand-paper or like abrading material $e$, after which the block is placed within the clamp or holder D, and is firmly clasped between the jaws of the holder, one of these jaws $d$ being movable, so that it can be brought to bear tightly against the block E by operation of a screw-shaft $d'$, or in any other convenient manner. The top of the clamp D is preferably furnished with a dovetailed rib 24, held within a corresponding seat formed on the under face of the slideway 21, and a reciprocating motion is imparted to the clamp D by means of a pitman 25, attached, as at 26, to the clamp, and driven by a suitable crank 27, that receives motion from the source of power. The cross-bars 22, that serve to sustain the slideway 21 and the clamp D, are attached, as at 28, to suitable blocks 29, through which pass the screw-shafts 30, by means of which the raising and lowering of the cross-bars 22 and the clamp D can be conveniently effected, and by preference the screw-shafts 30 are provided each with a worm-wheel 31, operated by a common worm-shaft 32, having a crank 33 attached to one of its ends. The blocks 29, to which are bolted the ends of the cross-bars 22, while provided with perforations through which the screw-shafts 30 pass, are preferably not screw-threaded, but rest upon screw-threaded blocks or nuts 35, that are held between the sides of the standards 20 and are moved up and down by the threaded shafts 30 in order to raise or lower the cross-bars 22.

Upon the blocks 29, to which the cross-bars 22 are attached, bear the coil-springs 36, which serve to force the cross-bars 22, the clamp D, and abrading-block E downward and thus cushion the abrading-block E so that it can press with the desired force upon the surface of the work. From this construction it will be seen that the raising and lowering of the clamp D and the abrading-block E can be readily effected in order to sustain the abrading-block at proper height for the particular work upon which it is designed to operate.

My object in providing the table B and feed-rolls C so they can be tilted, as indicated by dotted lines in Fig. 2 of the drawings, is to more particularly adapt the machine for working upon moldings—such as picture-moldings—where one part of the molding is thinner than another, and in which it is not necessary to so carefully abrade or polish the top portion of the molding, as it is not presented to view, or when it is desired to abrade one portion of the molding or other work more severely than another portion. Thus, for example, if the molding is of the outline illustrated in Fig. 2 of the drawings, and the table should be slightly tilted, the abrading-block E will bear with greater pressure upon the thinner part of the molding than upon its thicker portion.

As it is desirable to subject molding and like work to greater abrasion than could be secured by a single reciprocating abrading-block, I prefer to provide my machine also with one or more abrading-rolls F and G, each of these rolls being journaled in suitable vertically-adjustable boxes sustained by the brackets 50, that rise from the sides of the main frame of the machine. The vertical adjustment of the abrading-rolls F and G is preferably effected by means of screw-shafts 52, the lower ends of which are connected with the boxes of these rolls, while their upper ends are provided, by preference, with worm-wheels 53, that mesh with the worm-shafts 54, that extend from side to side of the machine. The periphery of each of the abrading-rolls F and G will be furnished with a groove of irregular outline corresponding to the contour of the molding or other article to be abraded, and the curved portions of the peripheries of these rolls will be coated with a suitable abrading material—such as sand, emery, or the like—applied to the rolls by glue or in other convenient manner. By preference, also, the grooved peripheries of the rolls will be coated with rubber or leather, or both, to which the abrading material will be applied, in order to give a more elastic action to the rolls. The rolls F and G may have their grooved peripheries coated with abradent material of different kind or degree of coarseness, the roll F, for example, having its grooved portion coated with coarse sand, while the roll G will have a coating of a much finer sand or emery-powder. The roll F may be conveniently driven by a pinion 60 and the roll G by a similar pinion 61, these pinions meshing with a common gear-wheel 16, and I prefer that the rolls F and G should be so geared as to revolve in the same direction as the feed-rolls beneath them, in order to more effectively abrade the surface of the work; or these rolls may be separately driven from the feed-rolls by belts.

Instead of providing the shafts 11 of the feed-rolls C with tilting gear-wheels, as seen in Fig. 2, I may form the shafts 11 of these feed-rolls in sections, as seen in Fig. 5, these sections being connected together by a suitable universal knuckle-joint or coupling 70, which will permit the rolls C' to revolve at an inclination. When this construction is adopted, the same mechanism will be employed at the opposite side of the table for raising and lowering it.

In Fig. 5 of the drawings is also illustrated improved means for imparting a laterally-reciprocating movement to an abrading-wheel, as a wheel of this character can be employed in certain classes of molding—such, for example, as have raised flat faces. The reciprocating movement of the roll R, which is journaled upon a shaft $r$, and is covered by a suitable sheet $r'$ of abrading material, is effected by means of a cam-block S, keyed upon the shaft $r$, and having a groove $s$, wherein projects the end of a pin $t$, depending from an arm or bracket T, that is bolted to the hanger $t'$, in which the shaft of the roll R is journaled, the opposite end of this shaft being suitably journaled in the main frame in manner similar to the rolls F and G. From this construction it will be plain that when the pin $t$ projects within the cam-groove $s$ of the block S and the shaft $r$ is rotated, the shaft will be given a reciprocating movement, causing a like reciprocating movement of the roll R. When, however, it is not desired to impart a reciprocating movement to the roll R, the pin $t$ will be raised from out the groove $s$ of the cam-block S, and the pin $t^2$ will be moved downwardly into the groove $s'$ of the block $s$, and when in such position will guard the roll against lateral movement.

Having thus described my invention, what I claim as new, and desire to secure by Letters Patent, is—

1. In an abrading-machine, the combination of a transversely-tilting support for the work, a clamp or support for holding the abrading material, a vertically-adjustable slideway for said clamp or support, screws for adjusting said slideway, and means for imparting a reciprocating movement to said clamp or support, substantially as described.

2. In an abrading-machine, the combination, with a tilting work-table, of an abrading-block and suitable means for imparting a reciprocating motion thereto, of a slideway for sustaining said block, and suitable springs for forcing the said block against the work, substantially as described.

3. In an abrading-machine, the combination, with a vertically-adjustable abrading-roll, of a suitably-supported tilting feed-roll and suitable gearing for imparting rotation to said rolls in the same direction, substantially as described.

4. In an abrading-machine, the combination of a tilting table, tilting feed-rolls, a reciprocating abrading-block, an abrading-roll, and suitable gearing for driving said block and rolls, substantially as described.

ARTHUR W. STREET.

Witnesses:
GEO. P. FISHER, Jr.,
L. B. CARPENTER.